(12) United States Patent
Li

(10) Patent No.: US 6,275,531 B1
(45) Date of Patent: Aug. 14, 2001

(54) SCALABLE VIDEO CODING METHOD AND APPARATUS

(75) Inventor: Weiping Li, Palo Alto, CA (US)

(73) Assignee: Optivision, Inc., Palo Alto, CA (US)

( * ) Notice: Subject to any disclaimer, the term of this patent is extended or adjusted under 35 U.S.C. 154(b) by 0 days.

(21) Appl. No.: 09/169,829

(22) Filed: Oct. 11, 1998

Related U.S. Application Data
(60) Provisional application No. 60/093,860, filed on Jul. 23, 1998.

(51) Int. Cl.[7] ............................................ H04N 7/12
(52) U.S. Cl. ........................... 375/240.12; 370/468
(58) Field of Search ............................ 348/385, 387, 348/404, 409, 412, 415, 416; 370/425, 240.12, 456, 458; H04N 7/12

(56) References Cited

U.S. PATENT DOCUMENTS

| | | | |
|---|---|---|---|
| 5,457,496 | * 10/1995 | Hamano et al. | 348/415 |
| 5,457,497 | * 10/1995 | Thomas | 348/425 |
| 5,497,246 | * 3/1996 | Abe | 348/404 |
| 5,590,127 | * 12/1996 | Bales et al. | 370/468 |
| 5,612,735 | * 3/1997 | Haskell et al. | 348/409 |
| 5,729,532 | * 3/1998 | Bales et al. | 370/468 |
| 5,903,679 | * 5/1999 | Park | 382/253 |

FOREIGN PATENT DOCUMENTS

| | | | |
|---|---|---|---|
| 19531004 A1 | 2/1997 | (DE) | H04N/7/26 |
| 0 739 139 A2 | 10/1996 | (EP) | H04N/7/26 |
| 0 771 119 A2 | 5/1997 | (EP) | H04N/7/50 |
| WO 98/27733 | 6/1998 | (WO) | H04N/7/30 |

OTHER PUBLICATIONS

Gonzales, C. et al., "Flexibly scalable digital video coding", Signal Processing: *Image Communication*, vol. 5, No. 1/2, Elsevier Science Publishers (1993), pp. 5–20.

* cited by examiner

*Primary Examiner*—Vu Le
*Assistant Examiner*—Nhon T. Diep

(57) ABSTRACT

A video encoding method and apparatus for adapting a video input to a bandwidth of a transmission channel of a network that includes determining the number N enhancement layer bitstreams capable of being adapted to the bandwidth of the transmission channel of a network. A base layer bitstream is encoded from the video input wherein a plurality of enhancement layer bitstreams are encoded from the video input. The enhancement layer bit-streams are based on the base layer bitstream, wherein the plurality of enhancement layer bitstreams complements the base layer bitstream and the base layer bitstream and N enhancement layer bitstreams to are transmitted to the network.

11 Claims, 16 Drawing Sheets

SCALABLE VIDEO CODING METHOD AND APPARATUS

This application claims the benefit of and priority from Provisional Application No. 60/093,860, filed in the United States Patent and Trademark Office Jul. 7, 1998, entitled "A Scalable Video Coding Method" by inventor Weiping Li, which is hereby incorporated by reference.

BACKGROUND OF THE INVENTION

1. Field of the Invention

The present invention relates to a method and apparatus for the scaling of data signals the bandwidth of the transmission channel; and more particularly to a scalable video method and apparatus for coding video such that the received video is adapted to the bandwidth of the transmission channel.

2. Description of Related Art

Signal compression in the video arena has long been employed to increase the bandwidth of either the generating, transmitting, or receiving device. MPEG—an acronym for Moving Picture Experts Group—refers to the family of digital video compression standards and file formats developed by the group. For instance, the MPEG-1 video sequence is an ordered stream of bits, with special bit patterns marking the beginning and ending of a logical section.

MPEG achieves high compression rate by storing only the changes from one frame to another, instead of each entire frame. The video information is then encoded using a technique called DCT (Discrete Cosine Transform) which is a technique for representing a waveform data as a weighted sum of cosines. MPEG use a type of lossy compression wherein some data is removed. But the diminishment of data is generally imperceptible to the human eye. It should be noted that the DCT itself does not lose data; rather, data compression technologies that rely on DCT approximate some of the coefficients to reduce the amount of data.

The basic idea behind MPEG video compression is to remove spatial redundancy within a video frame and temporal redundancy between video frames. The DCT-based (Discrete Cosine Transform) compression is used to reduce spatial redundancy and motion compensation is used to exploit temporal redundancy. The images in a video stream usually do not change much within small time intervals. Thus, the idea of motion-compensation is to encode a video frame based on other video frames temporally close to it.

A video stream is a sequence of video frames, each frame being a still image. A video player displays one frame after another, usually at a rate close to 30 frames per second. Macrblocks are formed, each macroblock consists of four 8×8 luminance blocks and two 8×8 chrominance blocks. Macroblocks are the units for motion-compensated compression, wherein blocks are basic unit used for DCT compression. Frames can be encoded in three types: intra-frames (I-frames), forward predicted frames (P-frames), and bi-directional predicted frames (B-frames).

An I-frame is encoded as a single image, with no reference to any past or future frames. Each 8×8 block is encoded independently, except that the coefficient in the upper left corner of the block, called the DC coefficient, is encoded relative to the DC coefficient of the previous block. The block is first transformed from the spatial domain into a frequency domain using the DCT (Discrete Cosine Transform), which separates the signal into independent frequency bands. Most frequency information is in the upper left corner of the resulting 8×8 block. After the DCT coefficients are produced the data is quantized, i.e. divided or separated. Quantization can be thought of as ignoring lower-order bits and is the only lossy part of the whole compression process other than subsampling.

The resulting data is then run-length encoded in a zig-zag ordering to optimize compression. The zig-zag ordering produces longer runs of 0's by taking advantage of the fact that there should be little high-frequency information (more 0's as one zig-zags from the upper left corner towards the lower right corner of the 8×8 block).

A P-frame is encoded relative to the past reference frame. A reference frame is a P- or I-frame. The past reference frame is the closest preceding reference frame. A P-macroblock is encoded as a 16×16 area of the past reference frame, plus an error term.

To specify the 16×16 area of the reference frame, a motion vector is included. A motion vector (0, 0) means that the 16×16 area is in the same position as the macroblock we are encoding. Other motion vectors are generated are relative to that position. Motion vectors may include half-pixel values, in which case pixels are averaged. The error term is encoded using the DCT, quantization, and run-length encoding. A macroblock may also be skipped which is equivalent to a (0, 0) vector and an all-zero error term.

A B-frame is encoded relative to the past reference frame, the future reference frame, or both frames.

A pictorial view of the above processes and techniques in application are depicted in prior art FIG. 15, which illustrates the decoding process for a SNR scalability. Scalable video coding means coding video in such a way that the quality of a received video is adapted to the bandwidth of the transmission channel. Such a coding technique is very desirable for transmitting video over a network with a time-varying bandwidth.

SNR scalability defines a mechanism to refine the DCT coefficients encoded in another (lower) layer of a scalable hierarchy. As illustrated in prior art FIG. 15, data from two bitstreams is combined after the inverse quantization processes by adding the DCT coefficients, Until the dat is combined, the decoding processes of the two layers are independent of each other.

The lower layer (base layer) is derived from the first bitstream and can itself be either non-scalable, or require the spatial or temporal scalability decoding process, and hence the decoding of additional bitstream, to be applied. The enhancement layer, derived from the second bitstream, contains mainly coded DCT coefficients and a small overhead.

In the current MEPG-2 video coding standard, there is an SNR scalability extension that allows two levels of scalability. MPEG achieves high compression rate by storing only the changes from one frame to another, instead of each entire frame. There are at least two disadvantages of employing the MEPG-2 standard for encoding video data. One disadvantage is that the scalability granularity is not fine enough, because the MEPG-2 process is an all or none method. Either the receiving device can receive all of the data from the base layer and the enhancement layer or only the data from the base layer bitstream. Therefore, the granularity is not scalable. In a network environment, more than two levels of scalability are usually needed.

Another disadvantage is that the enhancement layer coding in MEPG-2 is not efficient. Too many bits are needed in the enhancement layer in order to have a noticeable increase in video quality.

The present invention overcomes these disadvantages and others by providing, among other advantages, an efficient scalable video coding method with increased granularity.

SUMMARY OF THE INVENTION

The present invention can be characterized as a scalable video coding means and a system for encoding video data, such that quality of the final image is gradually improved as more bits are received. The improved quality and scalability are achieved by a method wherein an enhancement layer is subdivided into layers or levels of bitstream layers. Each bitstream layer is capable of carrying information complementary to the base layer information, in that as each of the enhancement layer bitstreams are added to the corresponding base layer bitstreams the quality of the resulting images are improved.

The number N of enhancement layers is determined or limited by the network that provides the transmission channel to the destination point. While the base layer bitstream is always transmitted to the destination point, the same is not necessarily true for the enhancement layers. Each layer is given a priority coding and transmission is effectuated according to the priority coding. In the event that all of the enhancement layers cannot be transmitted the lower priority coded layers will be omitted. The omission of one or more enhancement layers may be due to a multitude of reasons.

For instance, the server which provides the transmission channel to the destination point may be experiencing large demand on its resources from other users, in order to try and accommodate all of its users the server will prioritize the data and only transmit the higher priority coded packets of information. The transmission channel may be the limiting factor because of the bandwidth of the channel, i.e. Internet access port, Ethernet protocol, LAN, WAN, twisted pair cable, co-axial cable, etc. or the destination device itself, i.e. modem, absence of an enhanced video card, etc. may not be able to receive the additional bandwidth made available to it. In these instances only M number (M is an integer number= 0, 1, 2, . . . ) of enhancement layers may be received, wherein N number (N is an integer number=0, 1, 2, . . . ) of enhancement layers were generated at the encoding stage, $M \leq N$.

To achieve these and other advantages and in accordance with the purpose of the present invention, as embodied and broadly described, the scalable video method and apparatus according to one aspect of the invention includes a video encoding method for adapting a video input to a bandwidth of a transmission channel of a network, the method includes determining the number N of enhancement layer bitstreams capable of being adapted to the bandwidth of the transmission channel of the network. Encoding a base layer bitstream from the video input is then performed and encoding N number of enhancement layer bitstreams from the video input based on the base layer bitstream, wherein the plurality of enhancement layer bitstreams complements the base layer bitstream. The base layer bitstream and the N enhancement layer bitstreams are then provided to the network.

According to another aspect of the present invention, a video decoding method for adapting a video input to a bandwidth of a transmission channel of a network includes, determining number M of enhancement layer bitstreams of said video input capable of being received from said transmission channel of said network. Decoding a base layer bitstream from received video input and decoding M number of enhancement layer bitstreams from the received video input based on the base layer bitstream, wherein the M received enhancement layer bitstreams complements the base layer bitstream. Then reconstructing the base layer bitstream and N enhancement layer bitstreams.

According to still another aspect of the present invention, a video decoding method for adapting a video input to a bandwidth of a receiving apparatus, the method includes demultiplexing a base layer bitstream and at least one of a plurality of enhancement layer bitstreams received from a network, decoding the base layer bitstream, decoding at least one of the plurality of enhancement layer bitstreams based on generated base layer bitstream, wherein the at least one of the plurality of enhancement layer bitstreams enhances the base layer bitstream. Then reconstructing a video output.

According to a further aspect of the present invention, a video encoding method for encoding enhancement layers based on a base layer bitstream encoded from a video input, the video encoding method includes, taking a difference between an original DCT coefficient and a reference point and dividing the difference between the original DCT coefficient and the reference point into N bit-planes.

According to a still further aspect of the present invention, a method of coding motion vectors of a plurality of macroblocks, includes determining an average motion vector from N motion vectors for N macroblocks, utilizing the determined average motion vector as the motion vector for the N marcoblocks, and encoding 1/N motion vectors in a base layer bitstream.

Additional features and advantages of the invention will be set forth in the description which follows, and in part will be apparent from the description, or may be learned by practice of the invention. The aspects and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
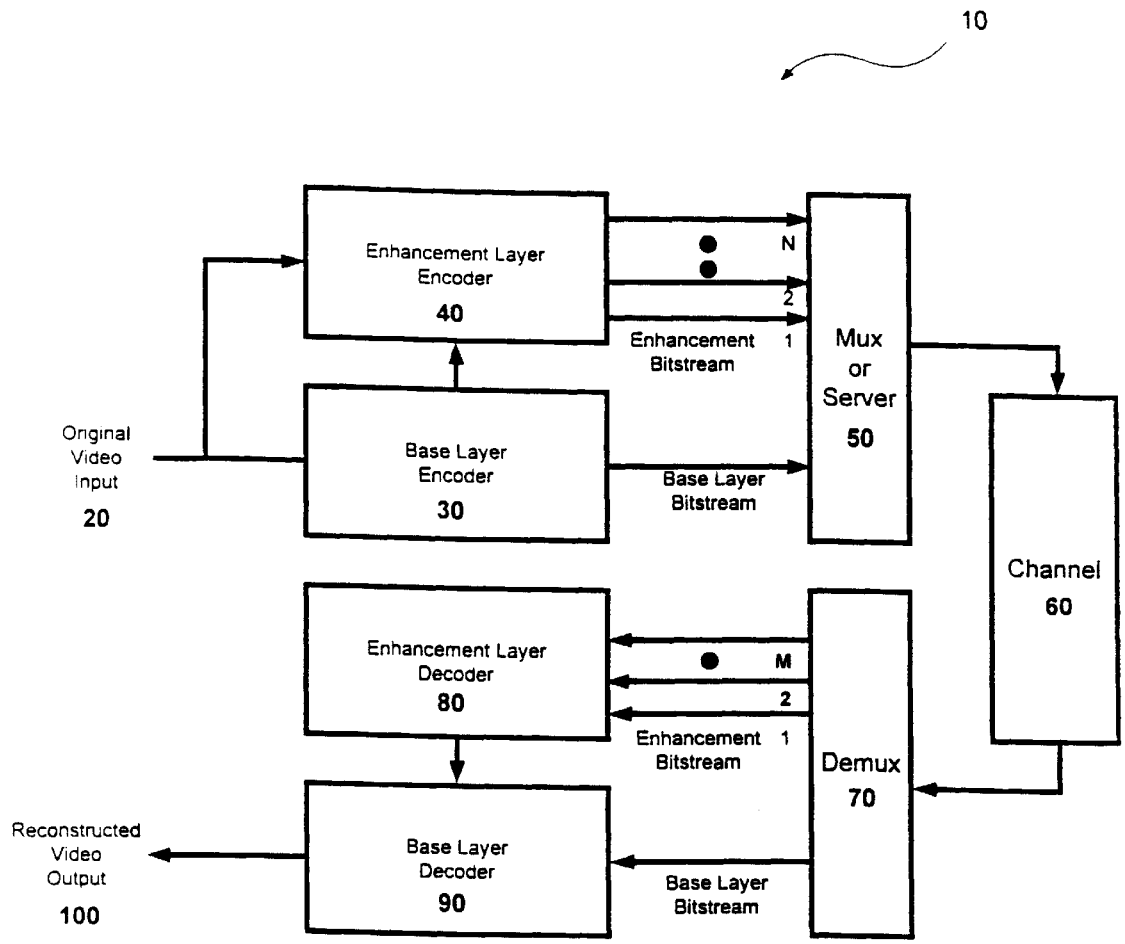
FIG. 1 illustrates a flow diagram of the scalable video encoding method of the present invention.
Figure 4:
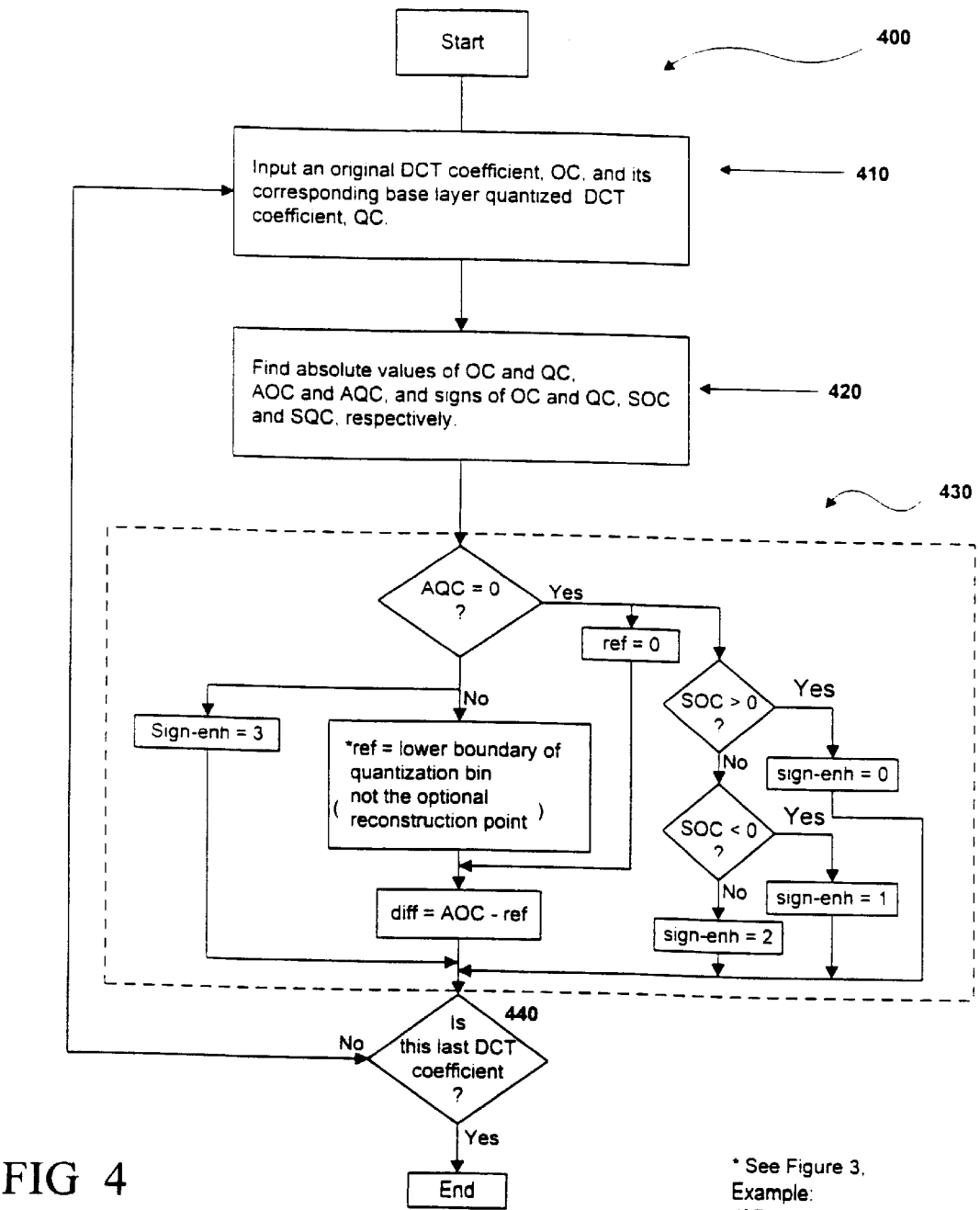
FIG. 4 illustrates a flow diagram for difference coding.
Figure 5:
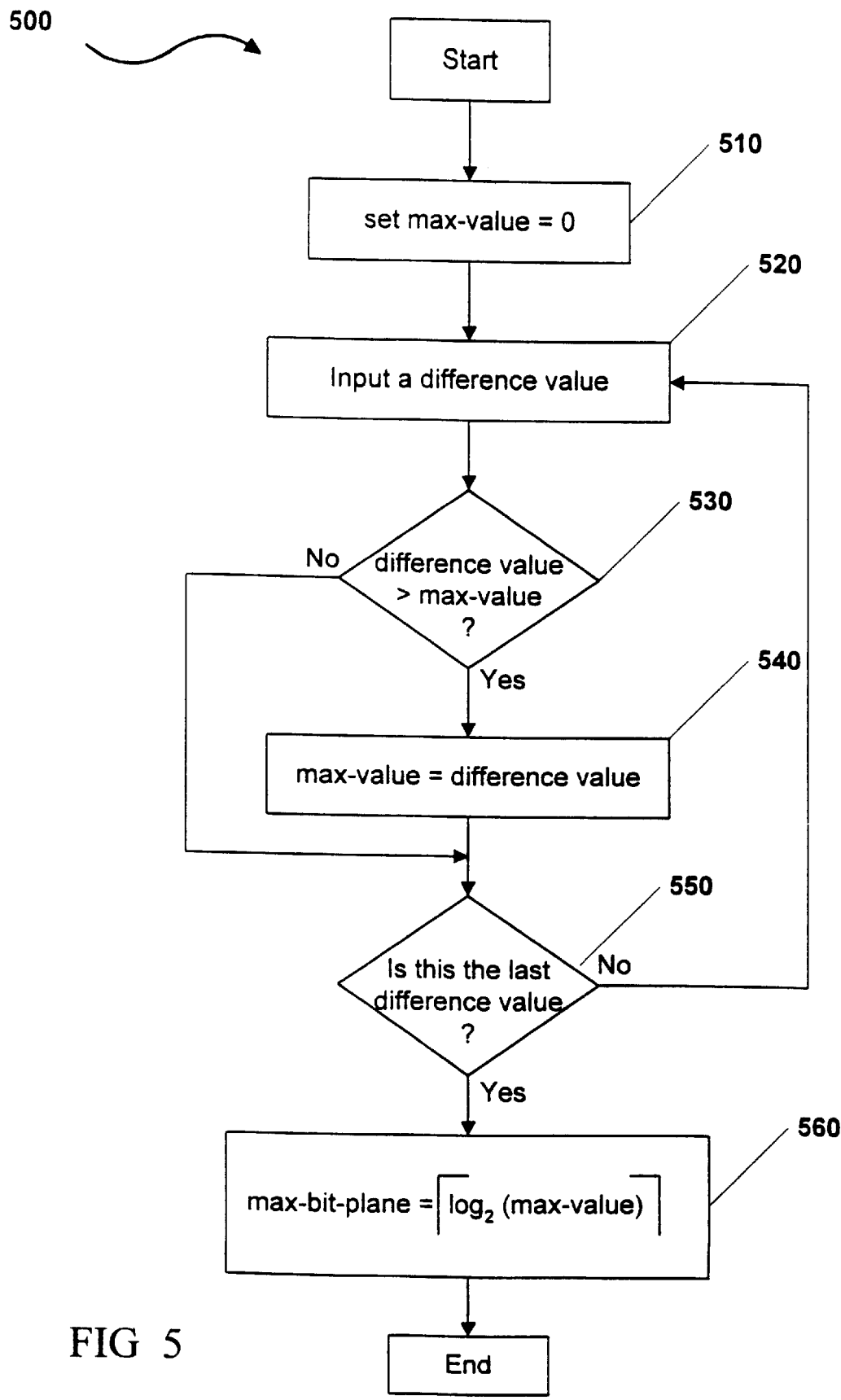
FIG. 5 illustrates a flow diagram for finding the maximum number of bit-planes in the DCT differences of a frame of the present invention.
Figure 6:
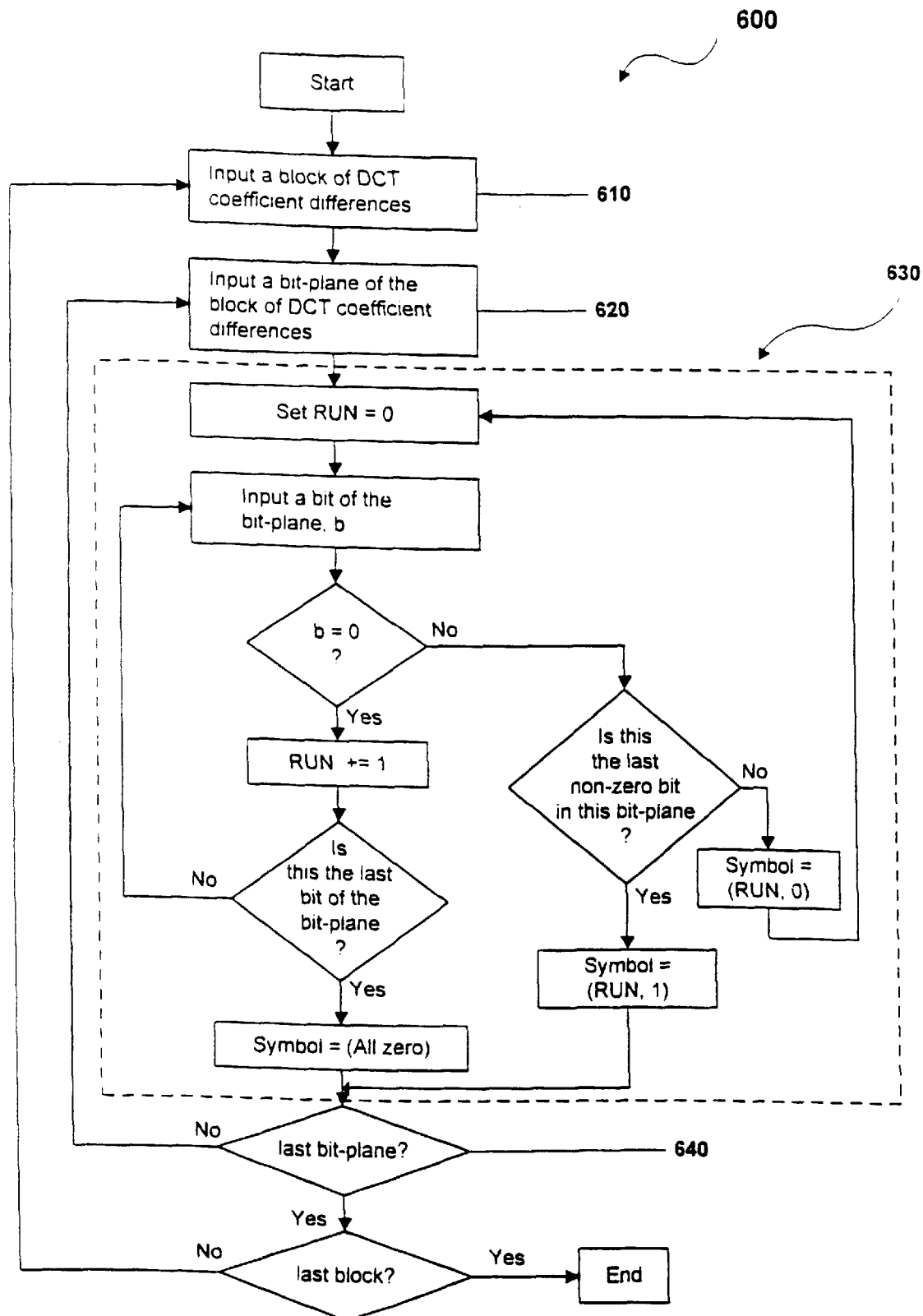
FIG. 6 illustrates a flow diagram for generating (RUN, EOP) Symbols of the present invention.
Figure 7:
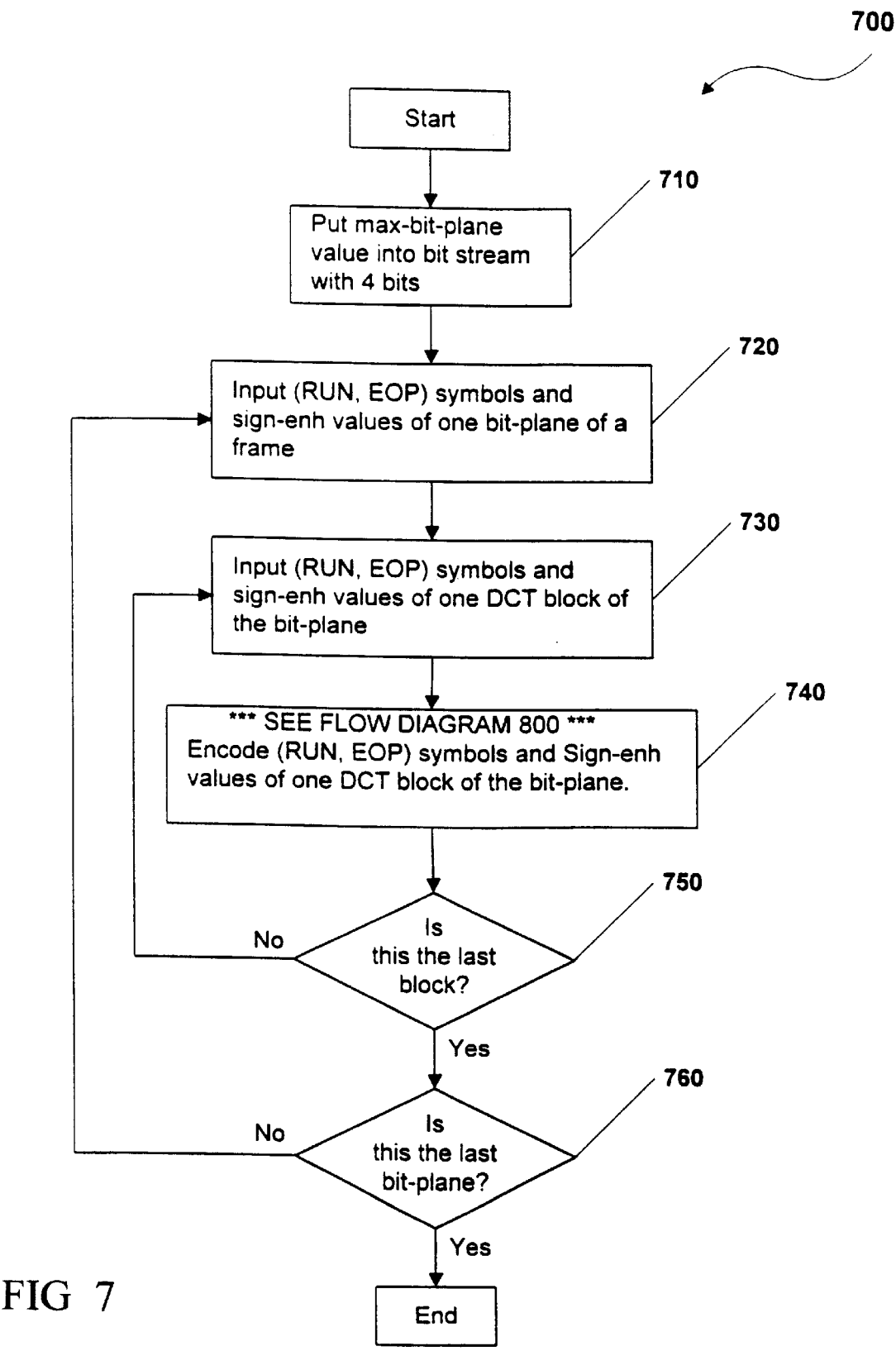
FIG. 7 Illustrates a flow diagram for encoding enhancement layers of the present invention.
Figure 8:
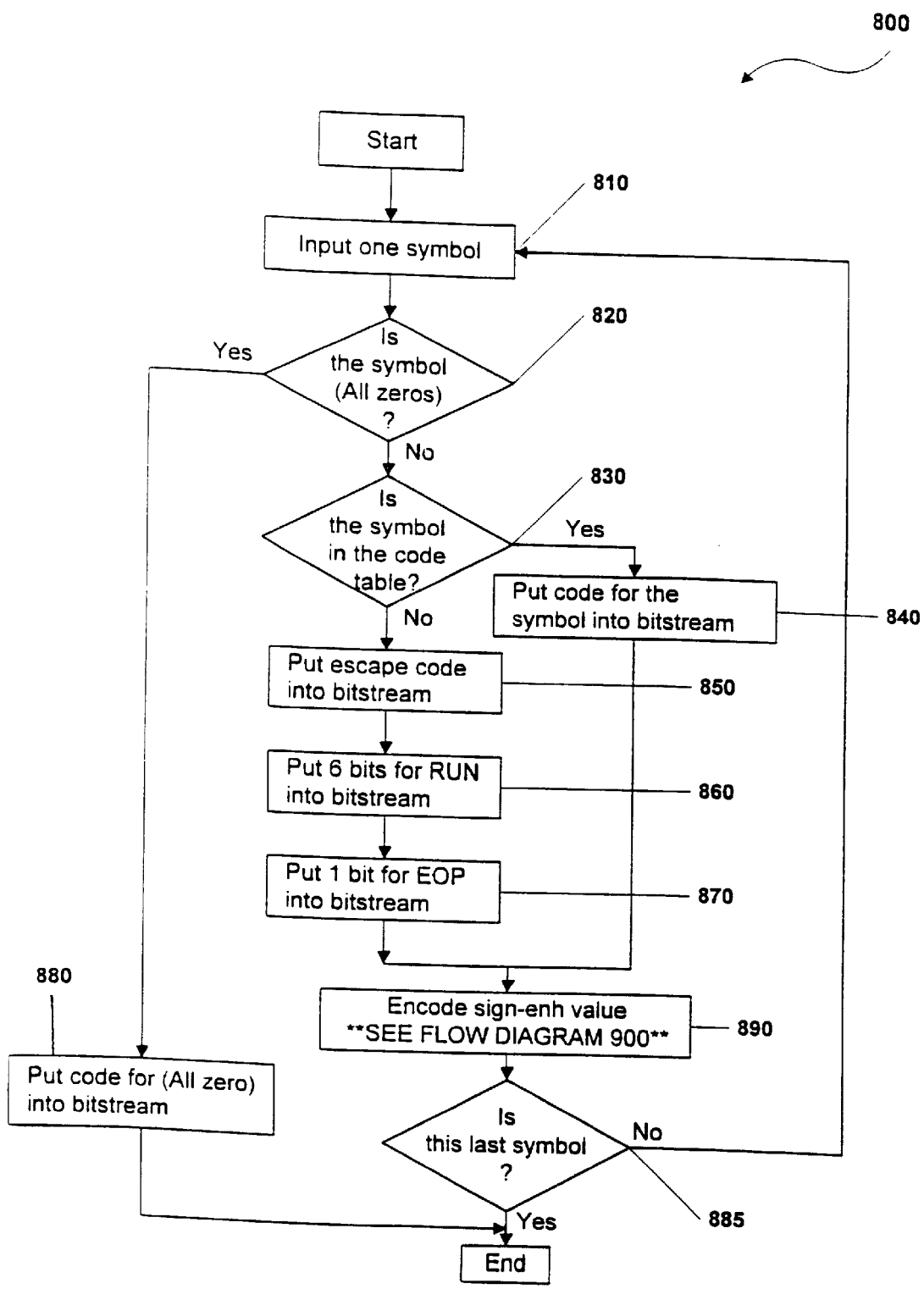
FIG. 8 illustrates a flow diagram for encoding (RUN, EOP) symbols and sign_enh values of one DCT block of one bit-plane.
Figure 9:
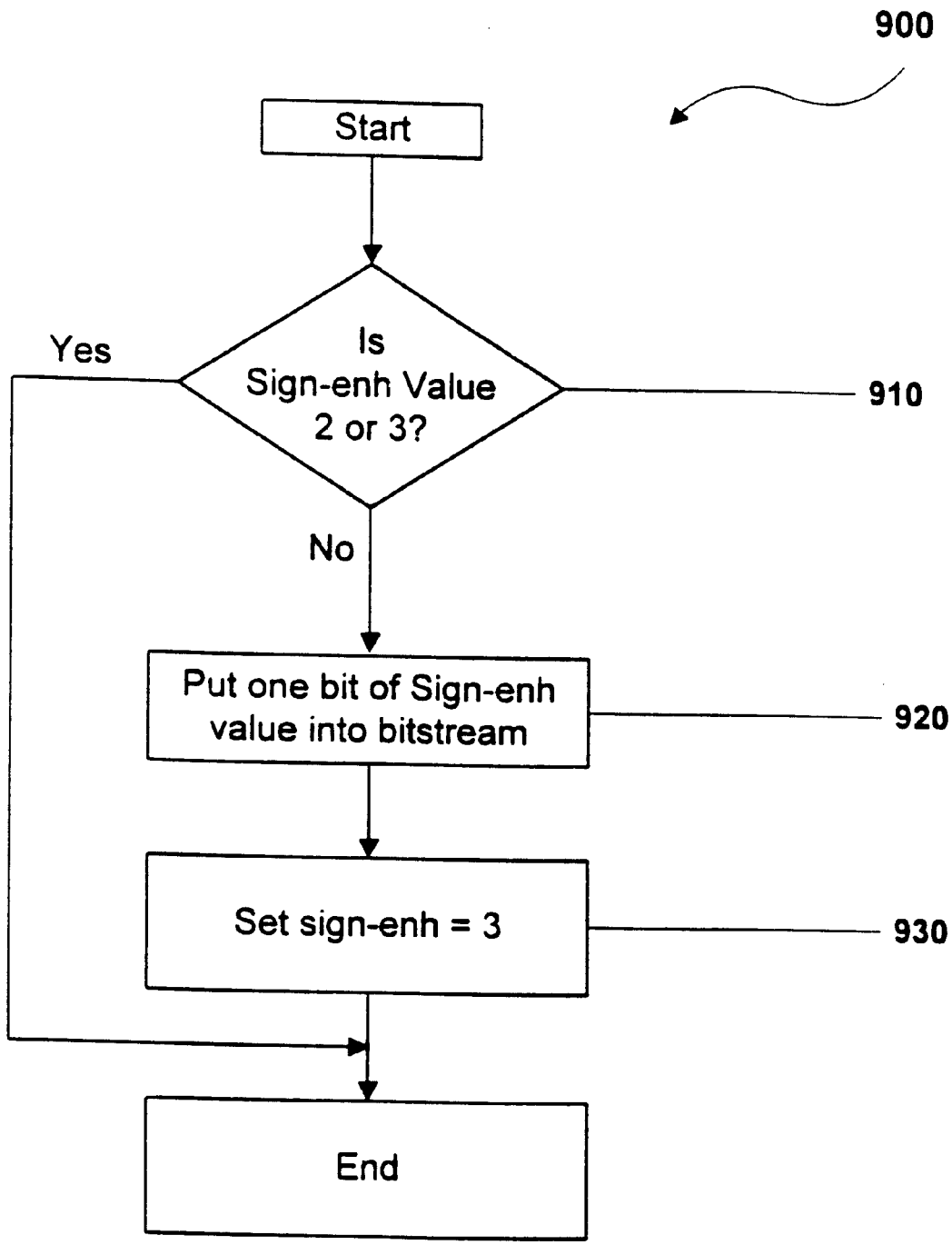
FIG. 9 illustrates a flow diagram for encoding a sign_enh value of the present invention.
Figure 10:
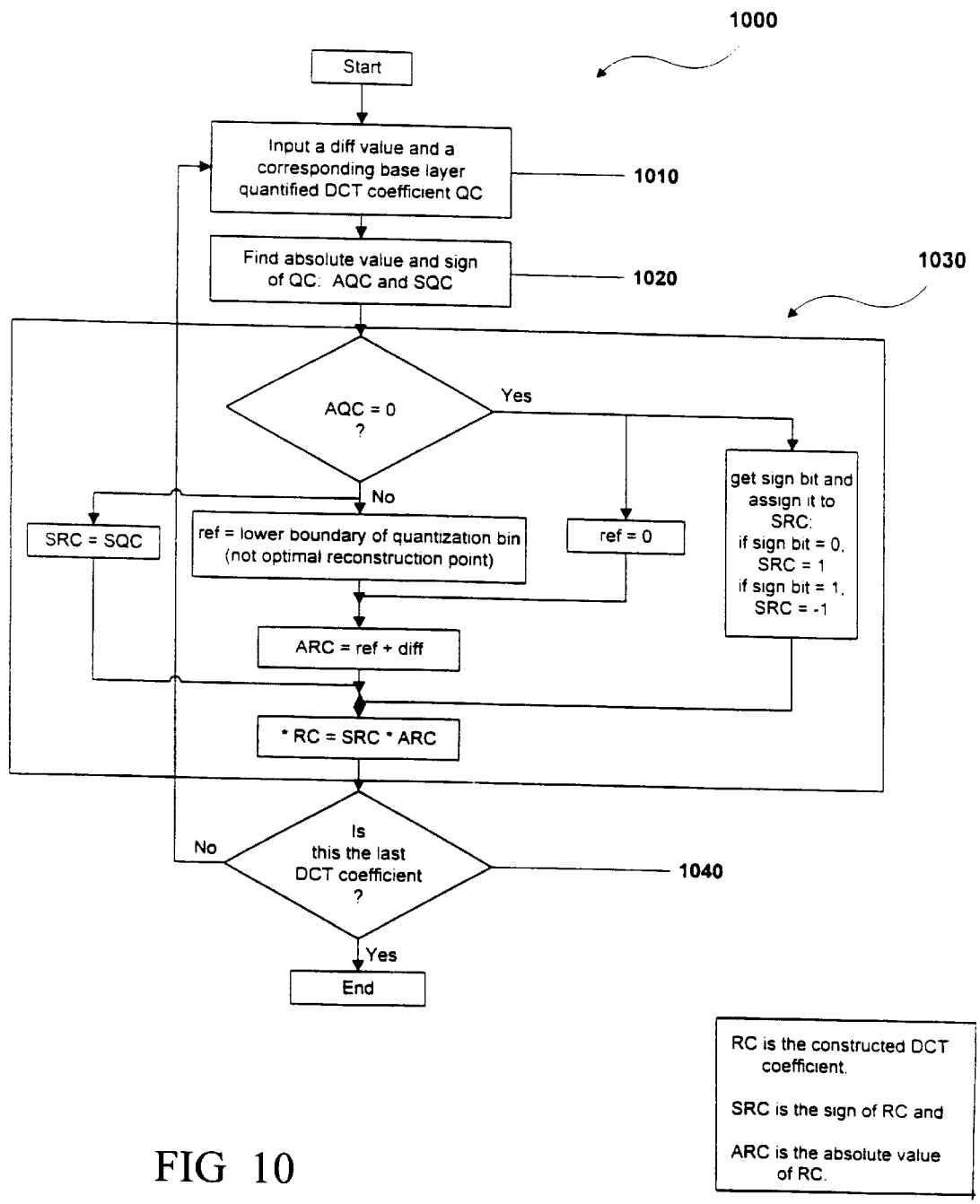
FIG. 10 illustrates a flow diagram for adding enhancement difference to a DCT coefficient of the present invention.
Figure 11:
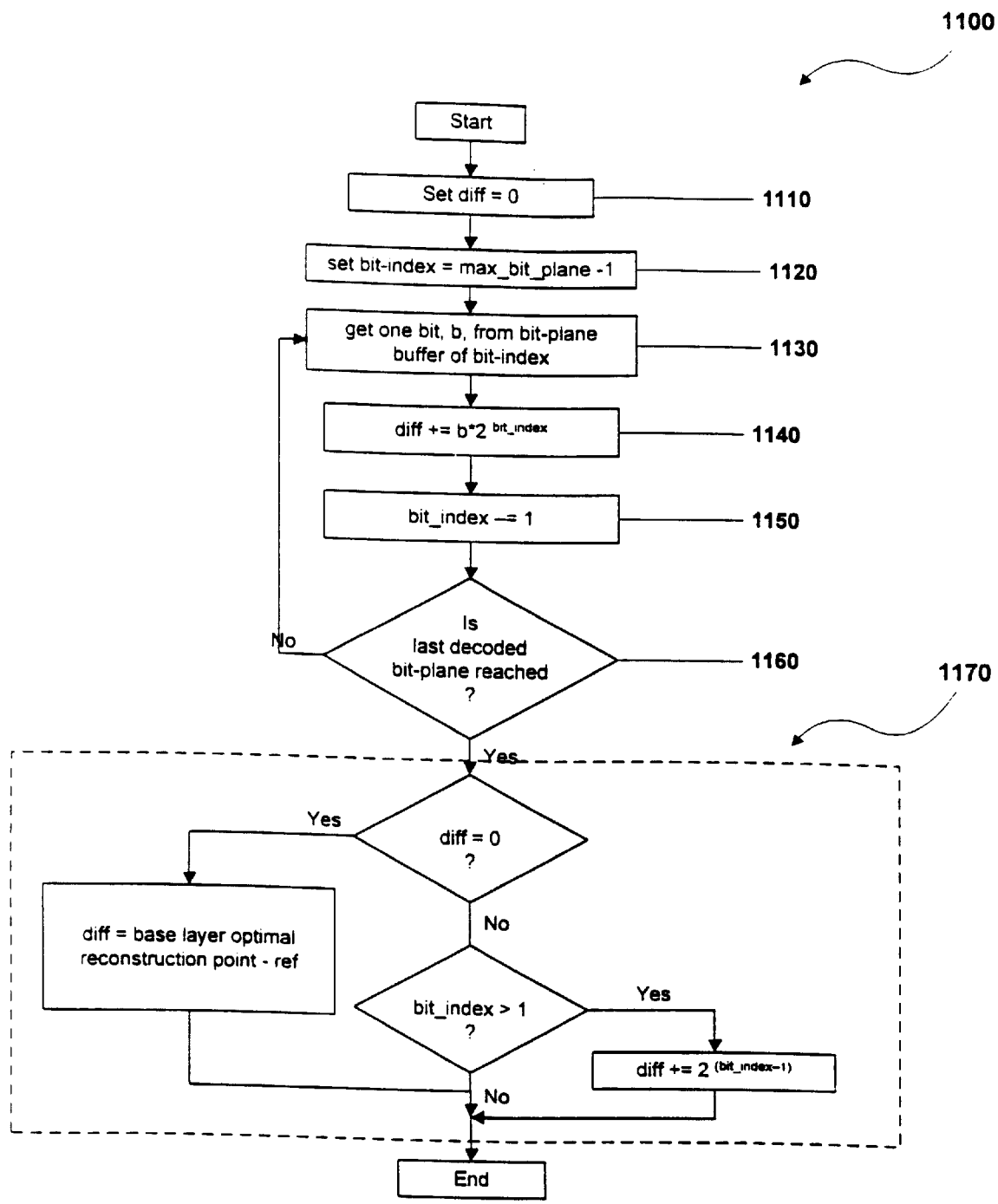
FIG. 11 illustrates a flow diagram for converting enhancement difference to a DCT coefficient of the present invention.
Figure 12:
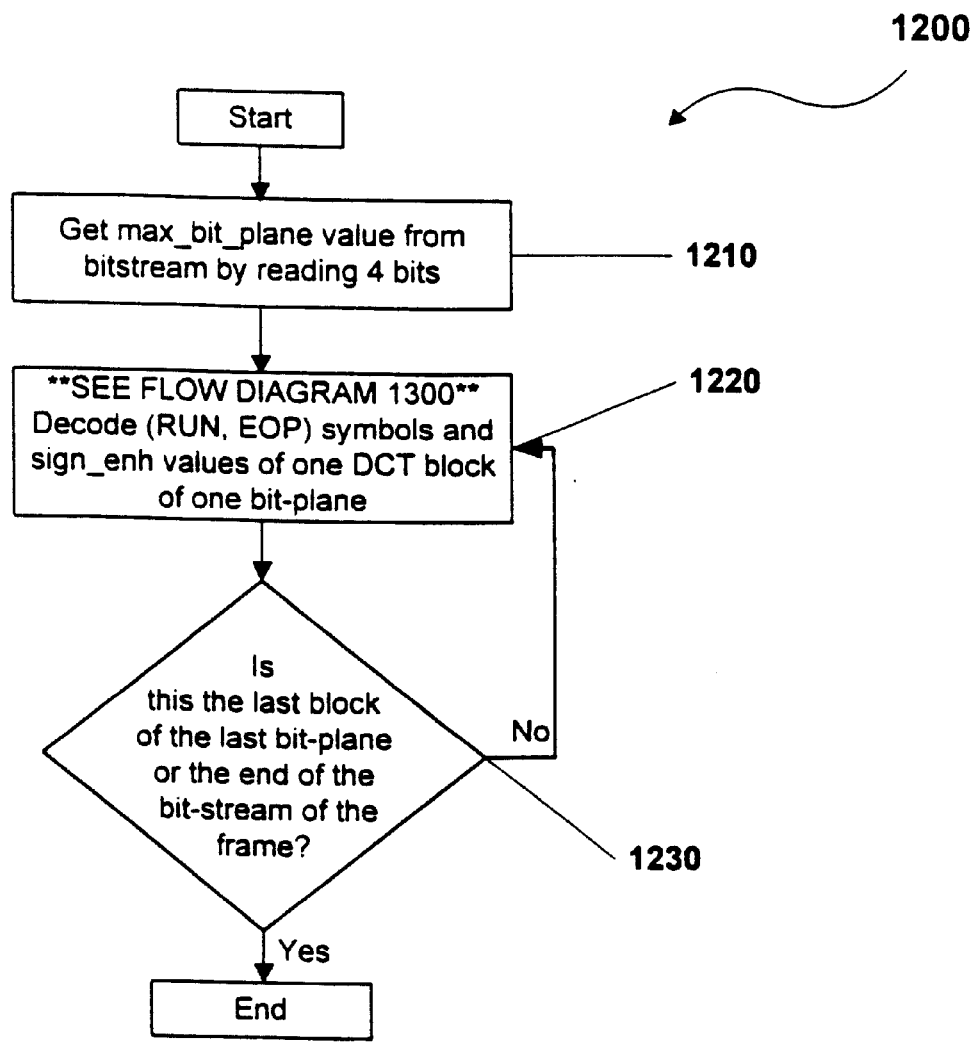
FIG. 12 illustrates a flow diagram for decoding enhancement layers of the present invention.
Figure 13:
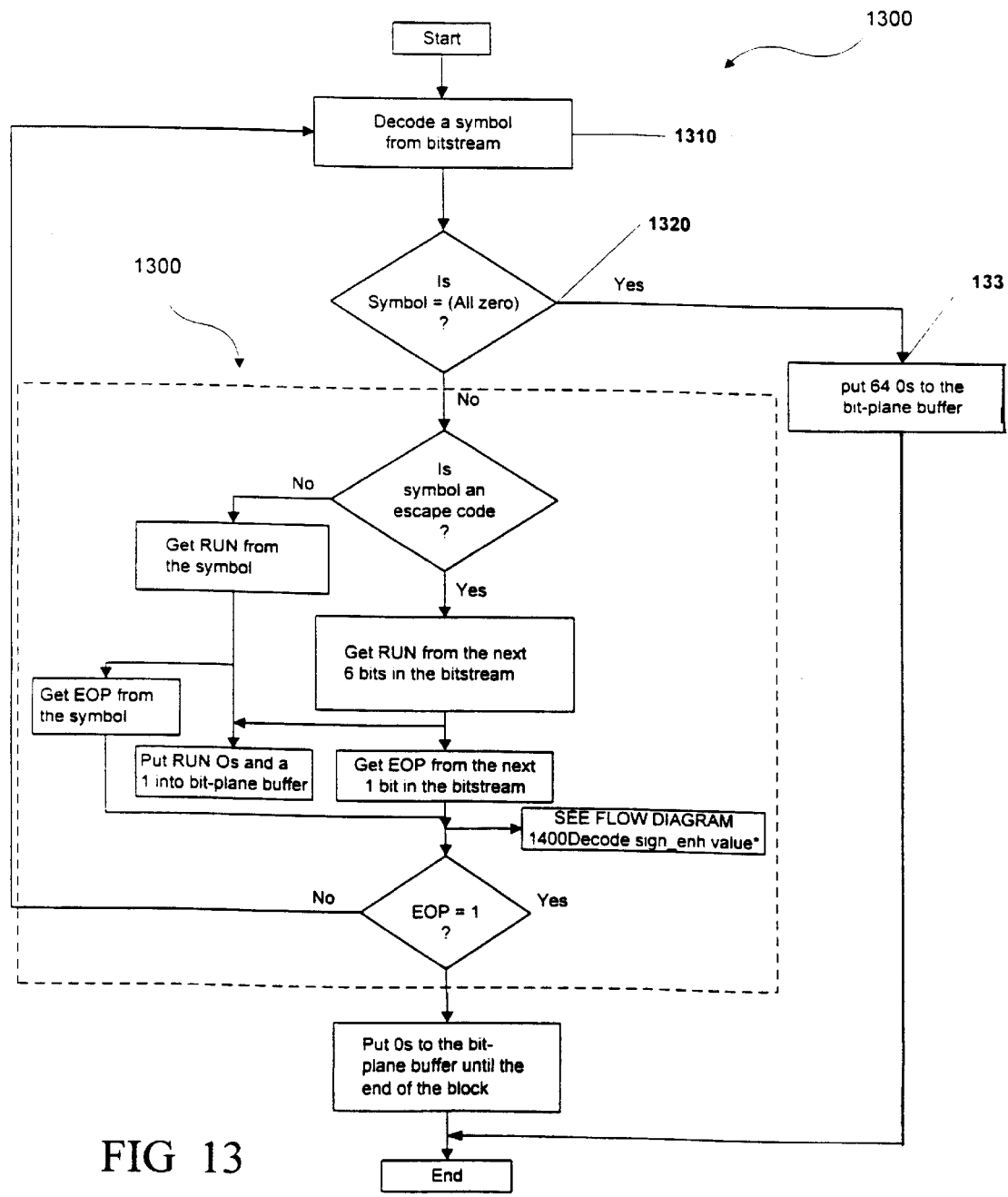
FIG. 13 illustrates a flow diagram for decoding (RUN, EOP) symbols and sign_enh values of one DCT block of one bit-plane.
Figure 14:
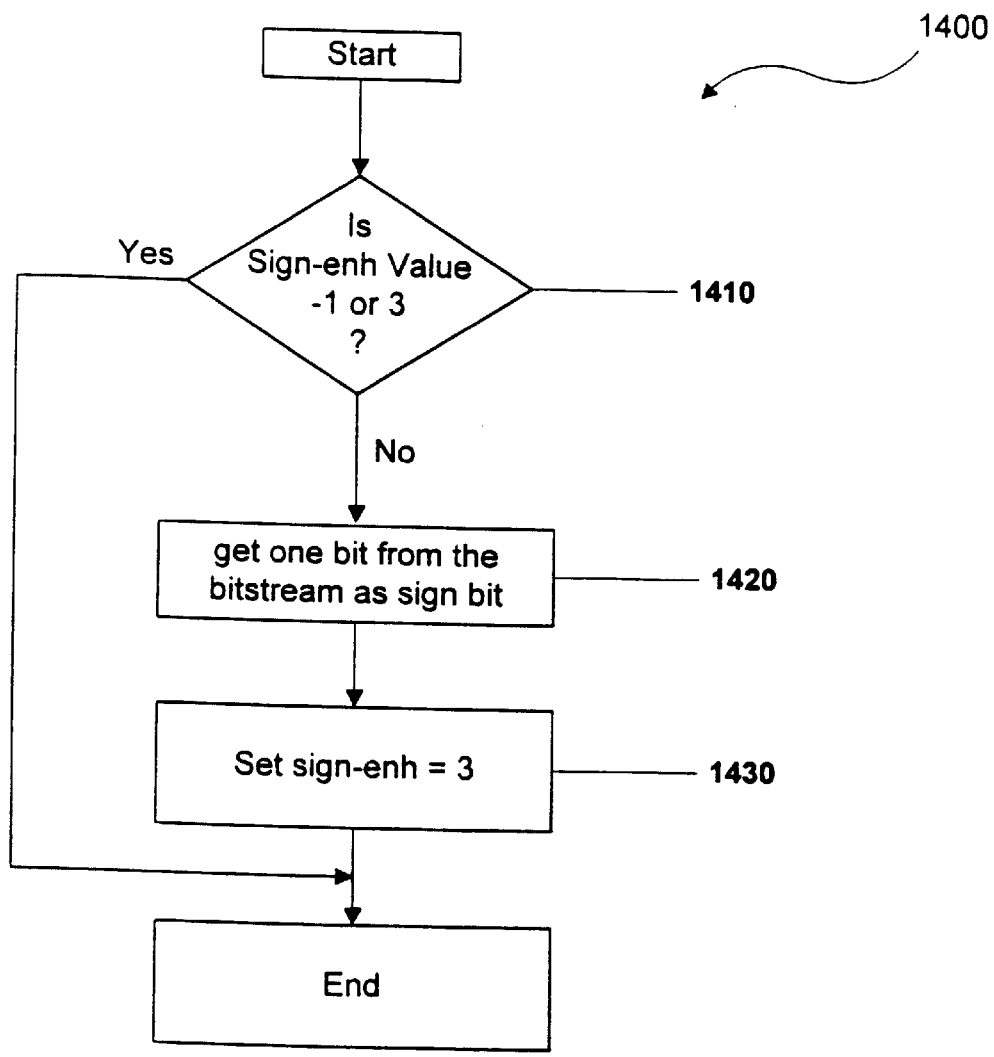
FIG. 14 illustrates a flow diagram for decoding a sign_enh value.
Figure 15:
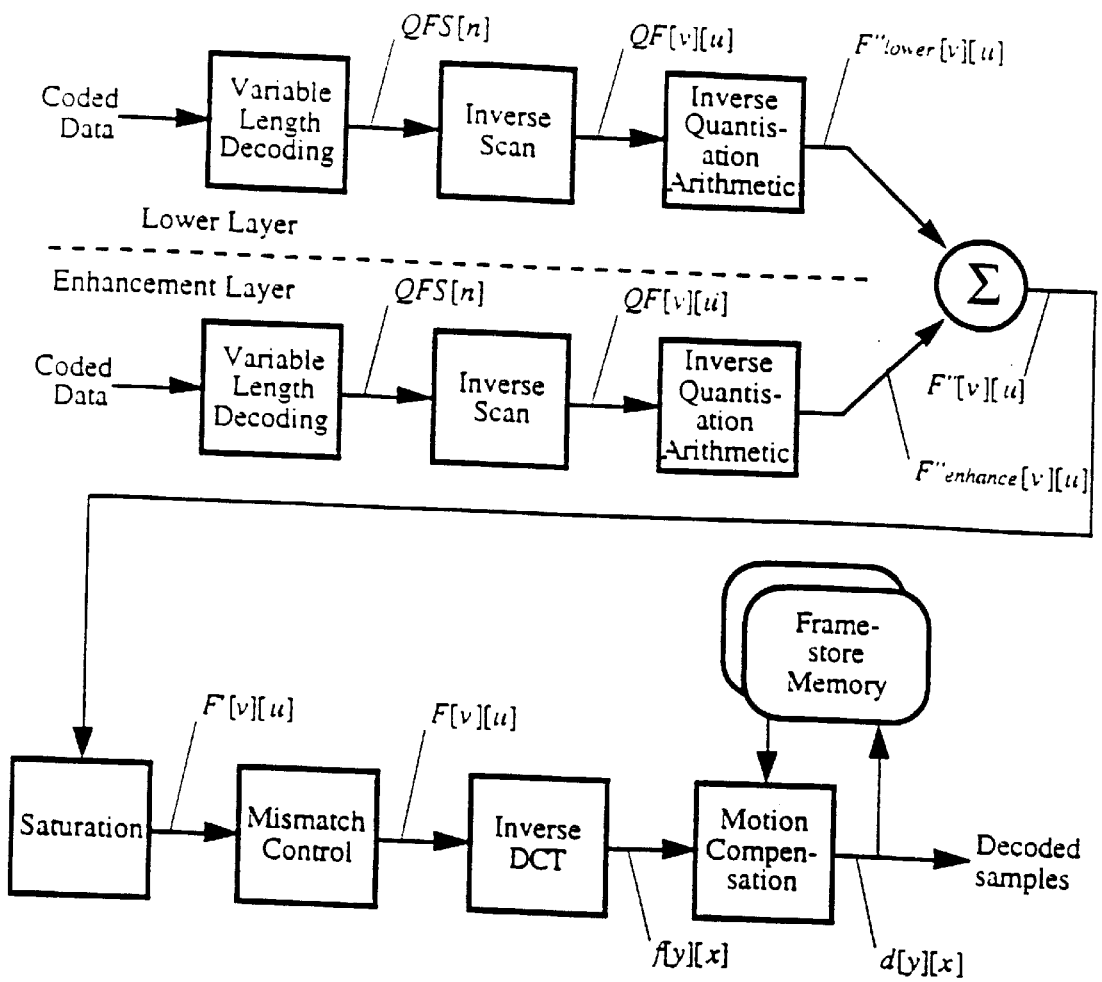
FIG. 15 illustrates a prior a conventional SNR scalability flow diagram.

FIG. 1 illustrates the scalable video diagram 10 of an embodiment of the present invention. The original video input 20 is encoded by the base layer encoder 30 in accordance with the method of represent by flow diagram 400 of FIG. 4. A DCT coefficient OC and its corresponding base layer quantized DCT coefficient QC are generated and a difference determined pursuant to steps 420 and 430 of FIG. 4. The difference information from the base layer encoder 30 is passed to the enhancement layer encoder 40 that encodes the enhancement information.

The encoding of the enhancement layer encoder is performed pursuant to methods 500–900 as depicted in FIGS. 5–10, respectively and will be briefly described. The bitstream from the base layer encoder 30 and the N bitstreams from the enhancement layer encoder 40 are capable of being sent to the transmission channel 60 by at least two methods.

In the first method all bitstreams are multiplexed together by multiplexor 50 with different priority identifiers, e.g., the base layer bitstream is guaranteed, enhancement bitstream layer 1 provided by enhancement layer encoder 40 is given a higher priority than enhancement bitstream layer 2. The prioritization is continued until all N (wherein N is an integer from 0, 1, 2, . . . ) of the bitstreams layers are prioritized. Logic in the encoding layers 30 or 40 in negotiation with the network and intermediated devices determine the number N of bitstream layers to be generated.

The number of bitstream layers generated is a function of the total possible bandwidth of the transmission channel 60, i.e. Ethernet, LAN, or WAN connections (this list is not intended to exhaustive but only representation of potential limiting devices and/or equipment), and the network and other intermediate devices. The number of bitstream layers M (wherein M is an integer and $M \leq N$) reaching the destination point 100 can be further limited by not just the physical constraints of the intermediate devices but the congestion on the network, thereby necessitating the dropping of bitstream layers according to their priority.

In a second method the server 50 knows the transmission channel 60 condition, i.e. congestion and other physical constraints, and selectively sends the bitstreams to the channel according to the priority identifiers. In either case, the destination point 100 receives the bitstream for the base layer and M bitstreams for the enhancement layer, where $M \leq N$.

The bitstreams M are sent to the base layer 90 and enhancement layer 80 decoders after being demultiplexed by demultiplexor 70. The decoded enhancement information from the enhancement layer decoder is passed to the base layer decoder to composite the reconstructed video output 100. The decoding of the multiplexed bitstreams are accomplished pursuant to the methods and algorithms depicted in flow diagrams 1100–1400 of FIGS. 11–14, respectively.

The base layer encoder and decoder are capable of performing logic pursuant to the MPEG-1, MPEG-2, or MPEG-4 (Version-1) standards that are hereby incorporated by reference into this disclosure.

Taking Residue with Probability Distribution Preserved

A detailed description of the probability distribution residue will now be made with reference to FIGS. 2A–3B.

Figure 2A:
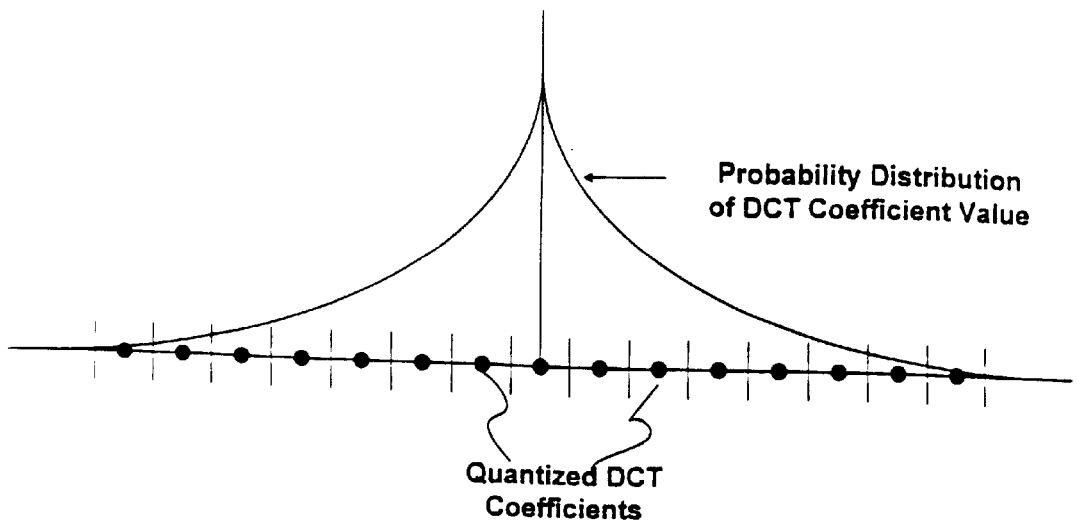
FIG. 2A illustrates conventional probability distribution of DCT coefficient values.

In the current MEPG-2 signal-to-noise ratio (SNR) scalability extension, a residue or difference is taken between the original DCT coefficient and the quantized DCT coefficient. FIG. 2A illustrates the distribution of a residual signal as a DCT coefficient. In taking the residue small values have higher probabilities and large values have smaller probabilities. The intervals along the horizontal axis represent quantization bins. The dot in the center of each interval represents the quantized DCT coefficient. Taking the residue between the original and the quantized DCT coefficient is equivalent to moving the origin to the quantization point.

Figure 2B:
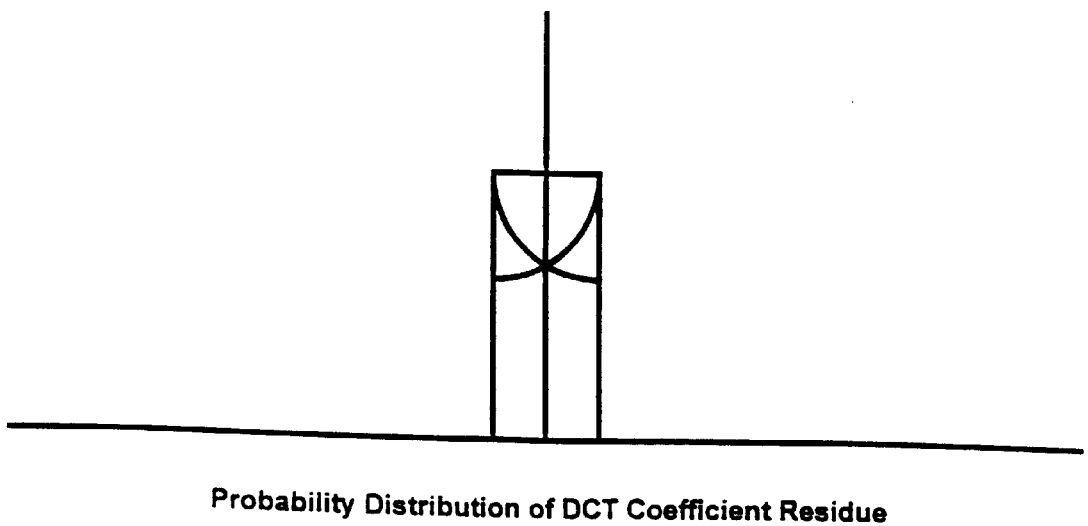
FIG. 2B illustrates conventional probability distribution of DCT coefficient residues.

Therefore, the probability distribution of the residue becomes that as shown in FIG. 2B. The residue from the positive side of FIG. 2A has a higher probability of being negative than positive and the residue taken from the negative side of the FIG. 2A has a higher probability of being positive than negative. The result is that the probability distribution of the residue becomes almost uniform. Thus making coding the residue more difficult.

Figure 3A:
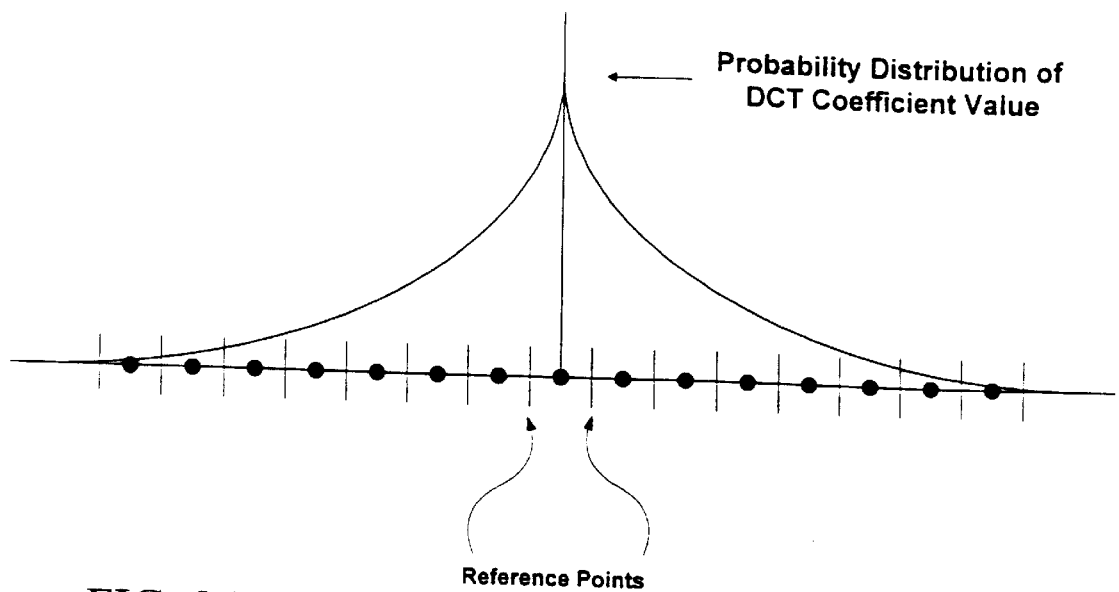
FIG. 3A illustrates the probability distribution of DCT coefficient values of the present invention.
Figure 3B:
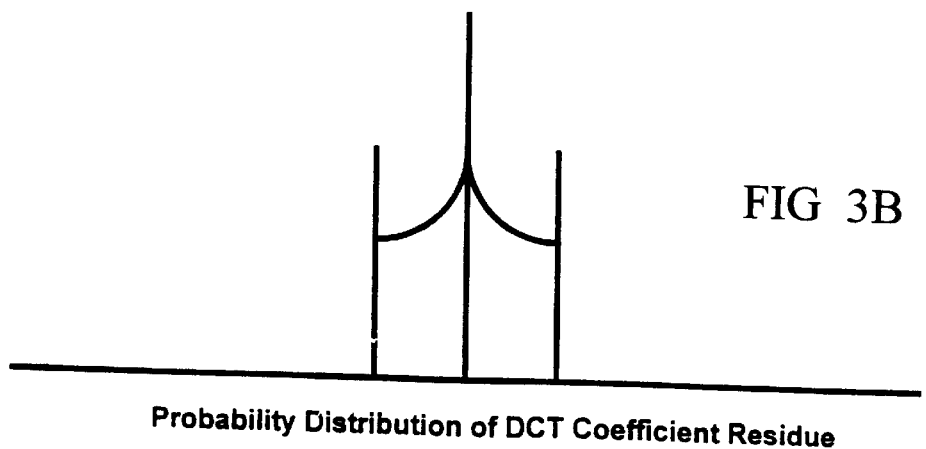
FIG. 3B illustrates the probability distribution of DCT coefficient residues of the present invention.

A vastly superior method is to generate a difference between the original and the lower boundary points of the quantized interval as shown in FIG. 3A and FIG. 3B. In this method, the residue is taken from the positive side of FIG. 2A remains positive and the residue from the negative side of FIG. 2A remains negative. Taking the residue is equivalent to moving the origin to the reference point as illustrated in FIG. 3A. Thus, the probability of the residue becomes as shown in FIG. 3B. This method preserves the shape of the original non-uniform distribution. Although the dynamic range of the residue taken in such a manner seems to be twice of that depicted in FIG. 2B, their is no longer a need to code the sign, i.e. − or +, of the residue. The sign of the residue is encoded in the base layer bitstream corresponding the enhancement layer, therefore this redundancy is eliminated and bits representing the sign are thus saved. Therefore, there is only a need to code the magnitude that still has a non-uniform distribution.

Bit Plane Coding of Residual DCT Coefficients

After taking residues of all the DCT coefficients in an 8×8 block, bit plane coding is used to code the residue. In bit-plane coding method the bit-plane coding method considers each residual DCT coefficient as a binary number of several bits instead of as a decimal integer of a certain value as in the run-level coding method. The bit-plane coding method in the present invention only replaces runlevel coding part. Therefore, all the other syntax elements remain the same.

An example of and description of the bit-plane coding method will now be made, wherein 64 residual DCT coefficients for an Inter-block and 63 residual DCT coefficients for an Intra-block (excluding the Intra-DC component that is coded using a separate method) are utilized for the example. The 64 (or 63) residual DCT coefficients are ordered into a one-dimensional array and at least one of the residual coefficients is non-zero. The bit-plane coding method then performs the following steps.

The maximum value of all the residual DCT coefficients in a frame is determined and the minimum number of bits, N, needed to represent the maximum value in the binary format is also determined. N is the number of bitplanes layers for this frame and is coded in the frame header.

Within each 8×8 block is represent every one of the 64 (or 63) residual DCT coefficients with N bits in the binary format and there is formed N bit-planes or layers or levels. A bit-plane is defined as an array of 64 (or 63) bits, taken one from each residual DCT coefficient at the same significant position.

The most significant bit-plane is determined with at least one non-zero bit and then the number of all-zero bit-planes between the most significant bit-plane determined and the Nth one is coded. Then starting from the most significant bit plane (MSB plane), 2-D symbols are formed of two components: (a) number of consecutive O's before a I (RUN), (b) whether there are any 1's left on this bit plane, i.e. End-Of-Plane (EOP). If a bit-plane after the MSB plane contains all O's, a special symbol ALL-ZERO is formed to represent an all-zero bit-plane. Note that the MSB plane does not have the all-zero case because any all-zero bit-planes before the MSB plane have been coded in the previous steps.

Four 2-D VLC tables are used, wherein the table VT-C-Table-0 corresponds to the MSB plane; table VLC-Table-I corresponds to the second MSB plane; table VLC-Table-2 corresponds to the third MSB plane; and table VLC-Table-3 corresponds to the fourth MSB and all the lower bit planes. For the ESCAPE cases, RUN is coded with 6 bits, EOP is coded with 1 bit. Escape coding is a method to code very small probability events which are not in the coding tables individually.

An example of the above process will now follow. For illustration purposes, we will assume that the residual values after the zigzag ordering are given as follows and N=6: The following representation is thereby produced.

10, 0, 6, 0, 0, 3, 0, 2, 2, 0, 0, 2, 0, 0, 1, 0, . . . 0, 0

The maximum value in this block is found to be 10 and the minimum number of bits to represent 10 in the binary format (1010) is 4. Therefore, two all-zero bit-planes before the MSB plane are coded with a code for the value 2 and the remaining 4 bit-planes are coded using the (RUN, EOP) codes. Writing every value in the binary format using 4 bits, the 4 bit-planes are formed as follows:

1, 0, 0, 0, 0, 0, 0, 0, 0, 0, 0, 0, 0, 0, 0,0, 0 (MSB-plane)

0, 0, 1, 0, 0, 0, 0, 0, 0, 0, 0, 0, 0, 0, 0, 0,0, 0 (Second MSB-plane)

1, 0, 1, 0, 0, 1, 0, 1, 1, 0, 0, 1, 0, 0, 0, 0,0, 0 (Third MSB-plane)

0, 0, 0, 0, 0, 1, 0, 0, 0, 0, 0, 0, 0, 1, 0,0, 0 (Fourth MSB-plane or LSB-plane)

Converting the bits of each bit-plane into (RUN, EOP) symbols results in the following:

(0, 1) (MSB-plane)

(2, 1) (Second MSB-plane)

(0, 0), (1,O), (2,O), (1,O), (0, 0), (2, 1) (Third MSB-plane)

(5, 0), (8, 1) (Fourth MSB-plane or LSB-plane)

Therefore, there are 10 symbols to be coded using the (RUN, EOP) VLC tables. Based on their locations in the bit-planes, different VLC tables are used for the coding. The enhancement bitstream using all four bitplanes looks as follows:

code leading-all-zero(2)

code msb(O, 1)

code msb-1(2,1)

code-msb-2(0,0), code_msb-2(1,0), code-msb-2(2,O), code-msb-2(1,0), code-msb-2(0,0), code-msb-2(2, 1) code_msb-3(5,0), code_msb-3(8, 1).

In an alternative embodiment, several enhancement bitstreams may be formed from the four bit-planes, in this example from the respective sets comprising one or more of the four bit-planes.

Motion Vector Sharing

In this alternative embodiment of the present invention motion vector sharing is capable of being utilized when the base layer bitstream exceeds a predetermined size or more levels of scalability are needed for the enhancement layer. By lowering the number of bits required for coding the motion vectors in the base layer the bandwidth requirements of the base layer bitstream is reduced. In base layer coding, a macroblock (16×16 pixels for the luminance component and W pixels for each chronluminance components) of the current frame is compared with the previous frame within a search range. The closest match in the previous frame is used as a prediction of the current macroblock. The relative displacement of the prediction to the current macroblock, in the horizontal and vertical directions, is called a motion vector.

The difference between the current macroblock and it's prediction is coded using the DCT coding. In order for the decoder to reconstruct the current macroblock, the motion vector has to be coded in the bitstream. Since there is a fixed number of bits for coding a frame, the more bits spent on coding the motion vectors results in fewer bits for coding the motion compensated differences. Therefore, it is desirable to lower the number of bits for coding the motion vectors and leave more bits for coding the differences between the current macroblock and its prediction.

For each set of 2×2 motion vectors, the average motion vector can be determined and used for the four macroblocks. In order to not change the syntax of the base layer coding, four marcoblocks are forced to have the identical motion vectors. Since only one out four motion vectors is coded in the bitstream, the amount of bits spent on motion vector coding is reduced, therefore, there are more bits available for coding the differences. The cost for pursuing such a method is that the four macroblocks, which share the same motion vector may, not get the best matched prediction individually and the motion compensated difference may have a larger dynamic range, thus necessitating more bits to code the motion vector.

For a given fixed bitrate, the savings from coding one out of four motion vectors may not compensate the increased number of bits required to code the difference with a larger dynamic range. However, for a time varying bitrate, a wider dynamic range for the enhancement layer provides more flexibility to achieve the best possible usage of the available bandwidth.

Coding Sign Bits

In an alternative embodiment of the present invention, if the base layer quantized DCT coefficient is non-zero, the corresponding enhancement layer difference will have the same sign as the base layer quantized DCT. Therefore, there is no need to code the sign bit in the enhancement layer.

Conversely, if the base layer quantized DCT coefficient is zero and corresponding enhancement layer difference is non-zero, a sign bit is placed into enhancement layer bitstream immediately after the MSB of the difference. An example of the above method will now follow.

Difference of a DCT block after ordering 10, 0, 6, 0, 0, 3, 0, 2, 2, 0, 0, 2, 0, 0, 1, 0, . . . 0, 0

Sign indications of the DCT block after ordering 3, 3, 3, 2, 0, 3, 3, 1, 2, 2, 0, 3, 3, 1, 2, . . . 2, 3

0: base layer quantized DCT coefficient=0 and difference>0
1: base layer quantized DCT coefficient=0 and difference<0
2: base layer quantized DCT coefficient=0 and difference=0
3: base layer quantized DCT coefficient!=0

In this example, the sign bits associated with values 10, 6, 2 don't need to be coded and the sign bits associated with 3, 2, 2, 1 are coded in the following way:

Code(All Zero)

code (All Zero)

code(0,1)

code(2,1)

code(0,0),code(1,0),code(2,0),0,code(1,0),code(0,0),1,code(2,1),0 code(5,0),code(8,1),1

For every DCT difference, there is a sign indication associated with it. There are four possible cases. In the above coding 0, 1, 2, and 3 are used to denote the four cases. If the sign indication is 2 or 3, the sign bit does not have to be coded because it is either associated with a zero difference or available from the corresponding base layer data. If the sign indication is 0 or 1 a sign bit code is required once per difference value, i.e. not every bit-plane of the difference value. Therefore, a sign bit is put immediately after the most significant bit of the difference.

Optimal Reconstruction of the DCT Coefficients

In an alternative embodiment of the present invention, even though N enhancement bitstream layers or planes may have been generated, only M, wherein M≦N enhancement layer bits are available for reconstruction of the DCT coefficients due to the channel capacity, and other constraints such as congestion among others, the decoder 80 of FIG. 1 may receive no enhancement difference or only a partial enhancement difference. In such a case, the optimal reconstruction of the DCT coefficients is capable of proceeding along the following method:

If decoded difference=0, the reconstruction point is the same as that in base layer, otherwise, the reconstructed difference=decoded difference+¼*(1<<decoded_bit_plane) and the reconstruction point=reference point+reconstructed difference*Q_enh+Q_enh/2.

Figure 3C:
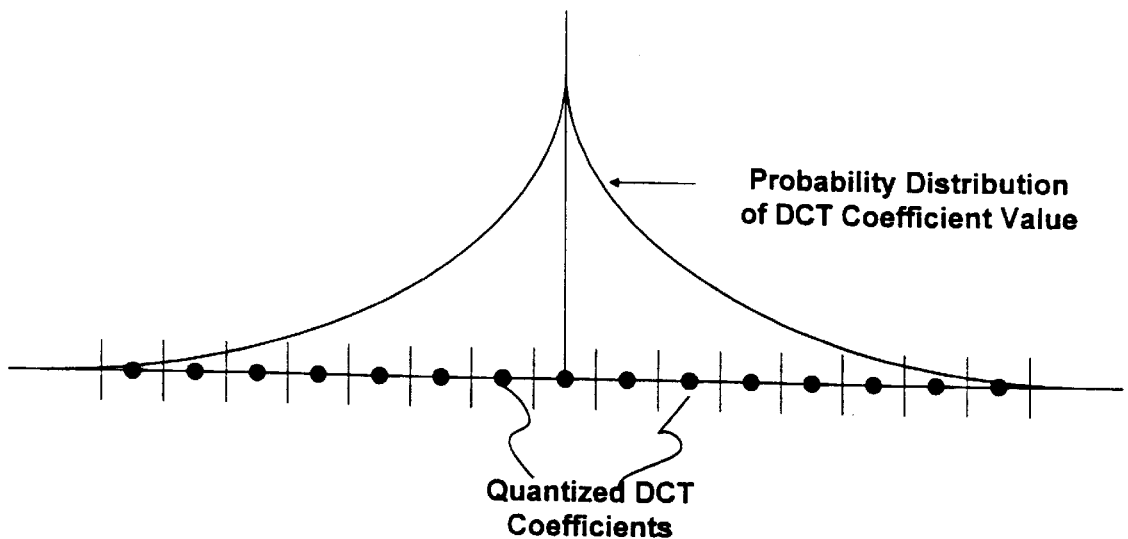
FIGS. 3C and 3D illustrates a method for taking a difference of a DCT coefficient of the present invention.
Figure 3D:
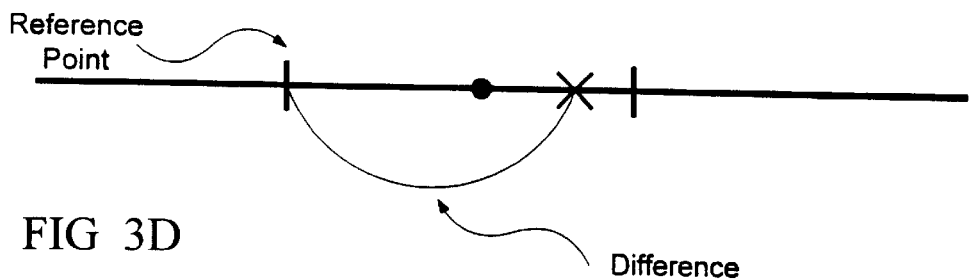

In the present embodiment, referring to FIGS. 3C and 3D, the optimal reconstruction point is not the lower boundary of a quantization bin. The above method specifies how to obtain the optimal reconstruction point in cases where the difference is quantized and received partially, i.e. not all of the enhancement layers generated are either transmitted or received as shown in FIG. 1. wherein M≦N.

What is claimed is:

1. A video encoding method for selectively adapting a video input for transmission over a specific channel of a network, wherein said network includes a plurality of channels, said channels having a plurality of different bandwidths, the method comprising the steps of:

determining number N of enhancement layer bitstreams capable of being adapted to said particular bandwidth of said specific transmission channel of said network;

encoding a base layer bitstream from said video input;

encoding N number of enhancement layer bitstreams from said video input based on the base layer bitstream, wherein the N enhancement layer bitstreams complement the base layer bitstream; and providing the base layer bitstream and N enhancement layer bitstreams to said network.

2. The video encoding method according to claim 1, wherein the determining step includes negotiating with intermediate devices on said network.

3. The video encoding method according to claim 2, wherein negotiating includes determining destination resources.

4. The video encoding method according to claim 1, wherein the step of encoding the base layer bitstreams is performed by a MPEG-1 encoding method.

5. The video encoding method according to claim 1, wherein the step of encoding the base layer bitstreams is performed by a MEPG-2 encoding method.

6. The video encoding method according to claim 1, wherein the step of encoding the base layer bitstreams is performed by a MPEG-4 encoding method.

7. The video encoding method according to claim 1, wherein the step of encoding the base layer bitstream is performed by a Discrete Cosine Transform (DCT) method.

8. The video encoding method according to claim 7, wherein after encoding the base layer bitstreams by a Discrete Cosine Transform (DCT) method a DCT coefficient is quantized.

9. The video encoding method according to claim 1, wherein the enhancement layer bitstreams are based on the difference of an original base layer DCT coefficient and a corresponding base layer quantized DCT coefficient.

10. The video encoding method according to claim 1, wherein the base layer bitstream and the N enhancement layer provide to the network are multiplexed.

11. The method of claim 10 further comprising the steps of:

demultiplexing said base layer bitstream and at least one of said plurality of enhancement layer bitstreams received from said network;

decoding said base layer bitstream;

decoding at least one of said plurality of enhancement layer bitstreams based on generated base layer bitstream, wherein the at least one of the plurality of enhancement layer bitstreams enhances the base layer bitstream; and reconstructing a video output.

* * * * *